(12) United States Patent
Olson

(10) Patent No.: US 10,337,601 B2
(45) Date of Patent: Jul. 2, 2019

(54) GEAR AND METHOD OF LUBRICATING A GEAR

(71) Applicant: Bell Helicopter Textron Inc., Fort Worth, TX (US)

(72) Inventor: Eric Stephen Olson, Fort Worth, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 396 days.

(21) Appl. No.: 14/870,170

(22) Filed: Sep. 30, 2015

(65) Prior Publication Data

US 2017/0089449 A1 Mar. 30, 2017

(51) Int. Cl.
*F16H 57/04* (2010.01)
*F16H 55/17* (2006.01)
*B64C 27/12* (2006.01)

(52) U.S. Cl.
CPC ......... *F16H 57/0431* (2013.01); *B64C 27/12* (2013.01); *F16H 55/17* (2013.01); *F16H 57/043* (2013.01); *F16H 57/0426* (2013.01); *F16H 57/0442* (2013.01); *F16H 57/0495* (2013.01); *F16H 57/0423* (2013.01); *F16H 57/0479* (2013.01); *F16H 57/0486* (2013.01)

(58) Field of Classification Search
CPC ............. F16H 57/0431; F16H 57/0495; F16H 57/0479; F16H 57/0486; F16H 57/0426; F16H 55/17; F16H 57/043; F16H 57/0423; F16H 57/0442; B64C 27/12
See application file for complete search history.

(56) References Cited

U.S. PATENT DOCUMENTS

| 1,502,083 | A | * | 7/1924 | Zoelly | F16H 57/0431 |
| | | | | | 184/15.1 |
| 3,495,471 | A | * | 2/1970 | Johnson | F16H 57/0456 |
| | | | | | 74/467 |
| 5,094,039 | A | * | 3/1992 | Yoshioka | B23F 21/03 |
| | | | | | 451/450 |
| 2009/0078075 | A1 | * | 3/2009 | Vassaux | F16H 57/0431 |
| | | | | | 74/468 |
| 2013/0220045 | A1 | * | 8/2013 | Slayter | F16H 55/17 |
| | | | | | 74/417 |
| 2013/0233105 | A1 | * | 9/2013 | Chen | F16H 57/12 |
| | | | | | 74/421 R |

* cited by examiner

*Primary Examiner* — Jake Cook
(74) *Attorney, Agent, or Firm* — Lightfoot & Alford PLLC

(57) ABSTRACT

A gear includes a toothed portion that has a plurality of teeth, an inner wall that defines a cavity, and a lubricant feed aperture. The lubricant feed aperture extends from the inner wall portion to a surface of a tooth. The lubricant feed aperture can deliver lubricant from the cavity to the surface of the tooth.

20 Claims, 6 Drawing Sheets

FIG. 10

GEAR AND METHOD OF LUBRICATING A GEAR

GOVERNMENT LICENSE RIGHTS

This invention was made with government support under the U.S. Army Aviation Applied Technology Directorate (AATD) Program, Contract No. W911W6-10-2-0007, awarded by U.S. Army. The government has certain rights in the invention.

BACKGROUND

Technical Field

This present disclosure relates generally to the lubrication of a gear. More particularly, the disclosure relates to the use of an aperture in a gear that allows lubricant to be delivered from a cavity within the gear to a toothed portion of the gear.

Description of Related Art

Aircraft drivetrains can include various components that produce and transfer power. For example, engines and gearboxes are common components. Such components generate heat and require lubrication. Excessive levels of heat can cause premature failure and create safety risks. Proper lubrication serves to reduce hard contact between moving components and reduce heat production.

Typically, aircraft use a variety of primary lubrication systems to provide wear protection and heat transfer within components. Under normal operating conditions, primary lubrication systems provide proper lubrication and heat removal. However, in cases of emergency, primary lubrication systems can fail resulting in excessive wear and failure of components, such as a gearbox or transmission.

Aircraft are generally required to maintain manageable flight operations for selected durations of time if the primary lubrication system fails (zero pressure). One method used to satisfy the requirements of manageable flight during a lubrication system failure is to increase the amount of lubricant reserves with resulting increase in the weight of the lubricant. Another method is to use a secondary lubrication system to operate when the primary lubrication system fails. Although not commonly used, secondary systems typically provide only sufficient lubricant to lubricate moving parts but can fail to adequately remove heat. Both methods increase the overall weight of the aircraft and can fail to sufficiently prevent heat generation. Therefore, an improved method of lubricating the gears of an aircraft gearbox during a loss of lubrication event is desired.

DESCRIPTION OF THE DRAWINGS

The novel features believed characteristic of the apparatus and method of the present disclosure are set forth in the appended claims. However, the apparatus and method itself, as well as a preferred mode of use, and further objectives and advantages thereof, will best be understood by reference to the following detailed description when read in conjunction with the accompanying drawings, wherein:

DESCRIPTION OF THE PREFERRED EMBODIMENT

Illustrative embodiments of the system and method of the present disclosure are described below. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
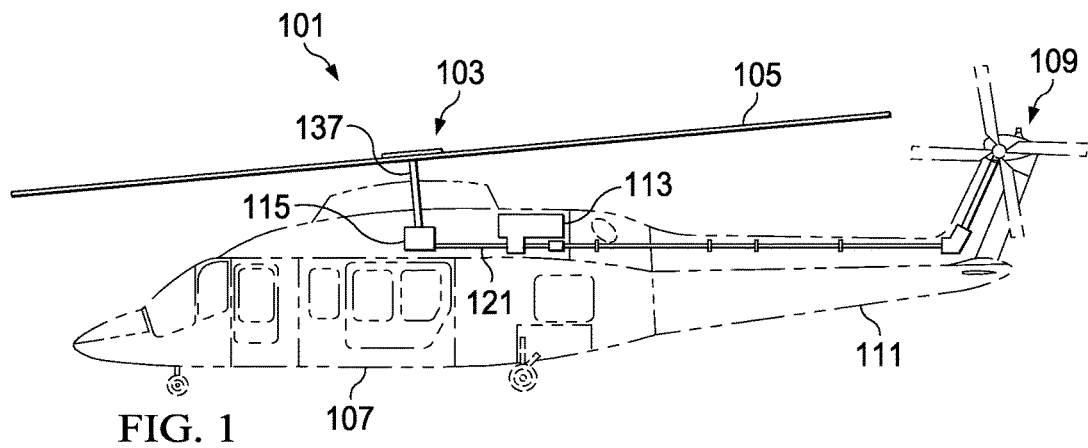
FIG. 1 is a side view of a rotorcraft, according to one example embodiment.

Referring now to FIG. 1 in the drawings, a rotorcraft 101 is illustrated. Rotorcraft 101 has a rotor system 103 with a plurality of rotor blades 105. The pitch of each rotor blade 105 can be managed in order to selectively control direction, thrust, and lift of rotorcraft 101. Rotorcraft 101 further includes a fuselage 107, anti-torque system 109, and an empennage 111. Torque is supplied to rotor system 103 and anti-torque system 109 with at least one engine 113. A main rotor gearbox 115 is operably associated with an engine main output driveshaft 121 and a main rotor mast 137.

It should be appreciated that rotorcraft 101 is merely illustrative of an aircraft for with which the system of the present disclosure can be implemented. Further, any air vehicle having a drive train component, such as a gearbox, can utilize the system of the present disclosure, such as fixed wing airplanes, tiltrotors, unmanned aircraft, gyrocopters, hybrid aircraft, and rotorcraft, to name a few.

Figure 2:
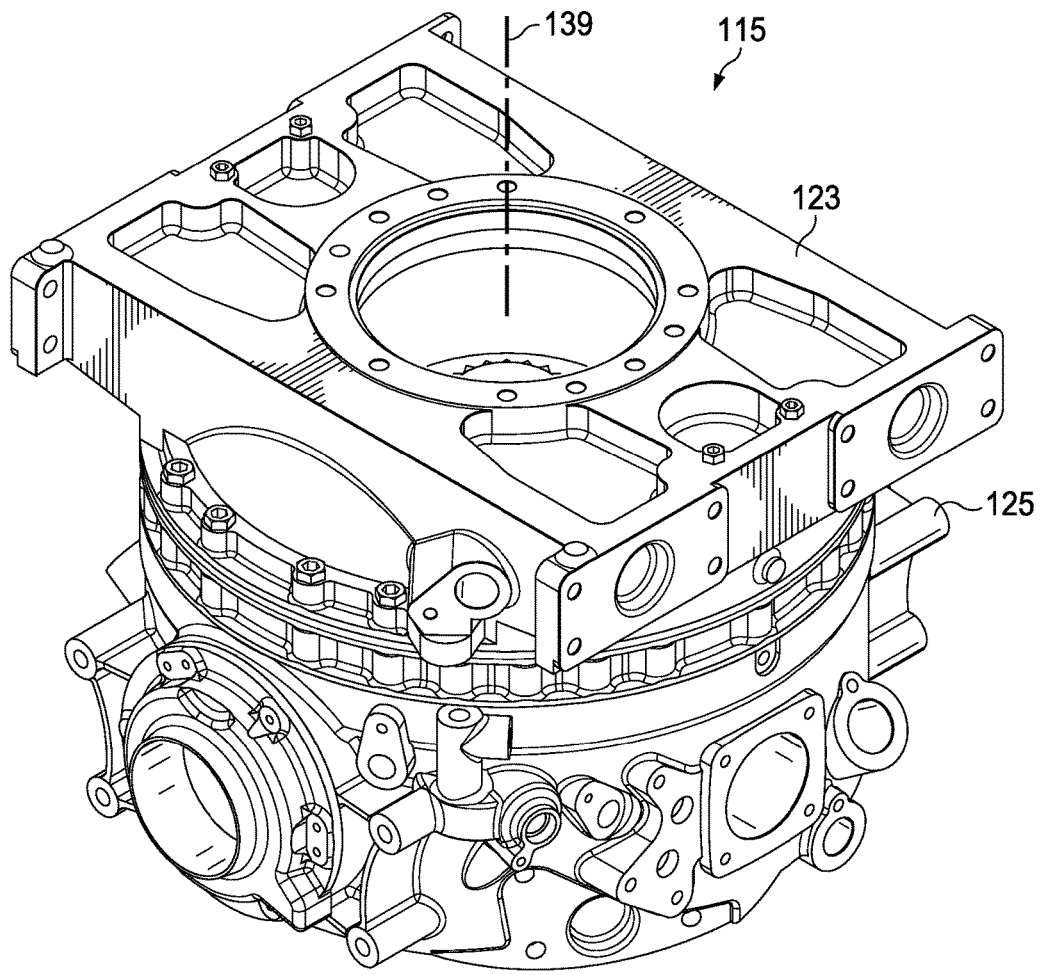
FIG. 2 is a perspective view of a gearbox, according to one example embodiment.
Figure 3:
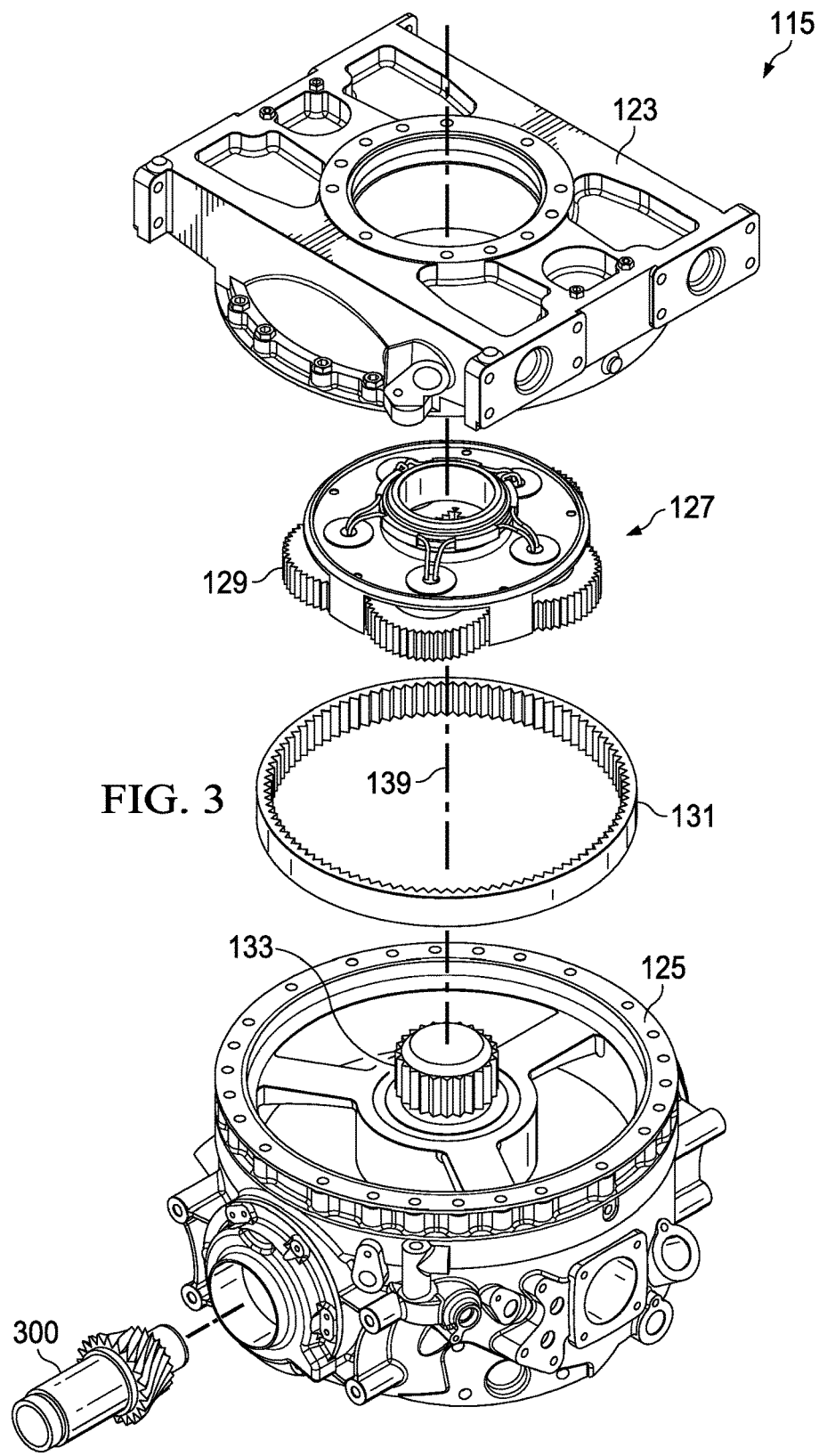
FIG. 3 is a partially exploded view of the gearbox shown in FIG. 2, according to one example embodiment.

Referring now also to FIGS. 2 and 3, gearbox 115 is illustrated in further detail. Gearbox 115 is configured to utilize rotational energy from main output driveshaft 121 to rotate main rotor mast 137. FIGS. 2 and 3 are a representative embodiment of a gearbox that may be configured to use the lubrication method of the present application. It is understood that other styles and sized gearboxes may also be used.

Gearbox 115 can include an upper housing 123 and a lower housing 125 that couple together to form a single unitary housing configured to encompass internal components. Internal components may include a planetary carrier assembly 127 having planetary pinions 129, a planetary ring gear 131, a planetary sun gear 133, and an input gear 300. Although described with specific internal components, it is understood that gearbox 115 may function with and utilize any number of selected components other than those depicted and described. It is understood that different embodiments of gearbox 115 may utilize either a plurality of planetary carrier assemblies 127, or may refrain from using any planetary carrier assemblies 127, depending on the configuration. Lower housing 125, planetary ring gear 131, planetary carrier assembly 127, and upper housing 123 are each configured to accept rotor mast 137 along a rotational axis 139. Input gear 300 is a portion of drive linkage interconnecting engine 113 and gearbox 115.

During operation of gearbox 115, heat is generated at the gear mesh points and bearings, which is then conducted through associated steel gears and shafts. For example, the gears and bearings surrounding input gear 300 can produce a significant amount of the heat within gearbox 115. Furthermore, the planetary carrier assembly 127 can also account for a significant amount of the heat generated within gearbox 115. Lubrication systems are used to decrease friction and to reduce the amount of heat that gearbox 115 generates. However, lubrication systems are susceptible to failure, resulting in gearbox 115 operating without lubrication and without the ability to sufficiently reduce the amount of heat generated. Internal components can fail if not lubricated sufficiently by the lubrication system.

Aircraft regulatory agencies, such as the Federal Aviation Administration (FAA) may require that aircraft gearboxes, such as gearbox 115, be operable for a requisite period of time after the primary lubrication system has failed. Such a requirement in aircraft gearboxes may be referred to as a "run dry" capability requirement. Therefore, aircraft can be required to maintain manageable flight operations for selected durations of time if the primary lubrication system fails (low pressure). The primary lubrication system can refer to the lubrication system or systems associated with gearbox 115 of the aircraft. The lubrication system of the present disclosure can be configured to maintain manageable flight operations of the aircraft for a selected duration in accordance with the "run dry" capability requirement. For example, the lubrication system of the present disclosure can be configured to prevent failure of gearbox 115 due to heat build-up for a specified time (possibly thirty minutes) after failure of the primary lubrication system. It is understood the time period may be lengthened or shortened. Manageable flight operations can refer to a degree of control a pilot has over the flight controls and drive train of an aircraft to sufficiently and safely land the aircraft. Gearbox 115, when equipped with the lubrication system of the present disclosure, can be configured to lengthen the time period gearbox 115 operates during a loss of lubricant event prior to failure of gearbox 115.

FIGS. 4 through 10 show several example embodiments of a gear and/or a lubrication delivery device of a lubrication system. A gear, such as gear 300, is configured to lengthen the time period gearbox 115 is operable during a loss of lubrication event. As will be explained in more detail below, gear 300 can include an aperture that is configured to deliver lubricant to a gear mesh. It should be understood that gear 300 is only one example of the many different types of gears that may benefit from the current disclosure. Different types of gears that may benefit from the current disclosure can include spur gears, helical gears, and hypoid gears, to name a few.

Figure 4:
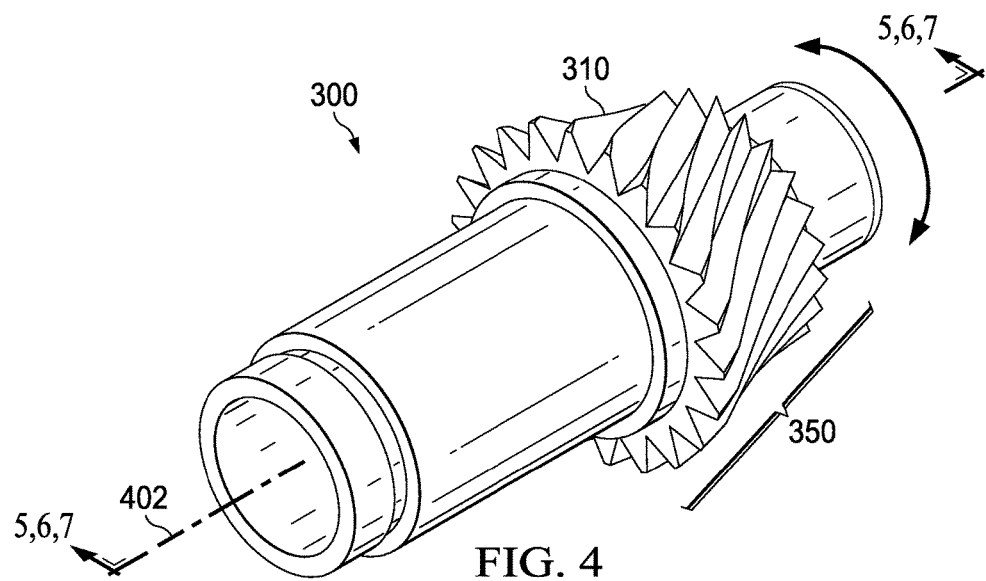
FIG. 4 is a perspective view of a gear of the gearbox shown in FIG. 3, according to one example embodiment.

Now referring also to FIG. 4, gear 300 can represent one of the gears used to transfer rotational energy. Gear 300 can be manufactured out of a gear steel, such as a high strength carburizing or nitriding steel. In one example embodiment, gear 300 can be a spiral bevel gear with a plurality of gear teeth 310 and can be configured to rotate on axis 402. The plurality of gear teeth 310 can define a toothed portion 350 of gear 300.

Figure 5:
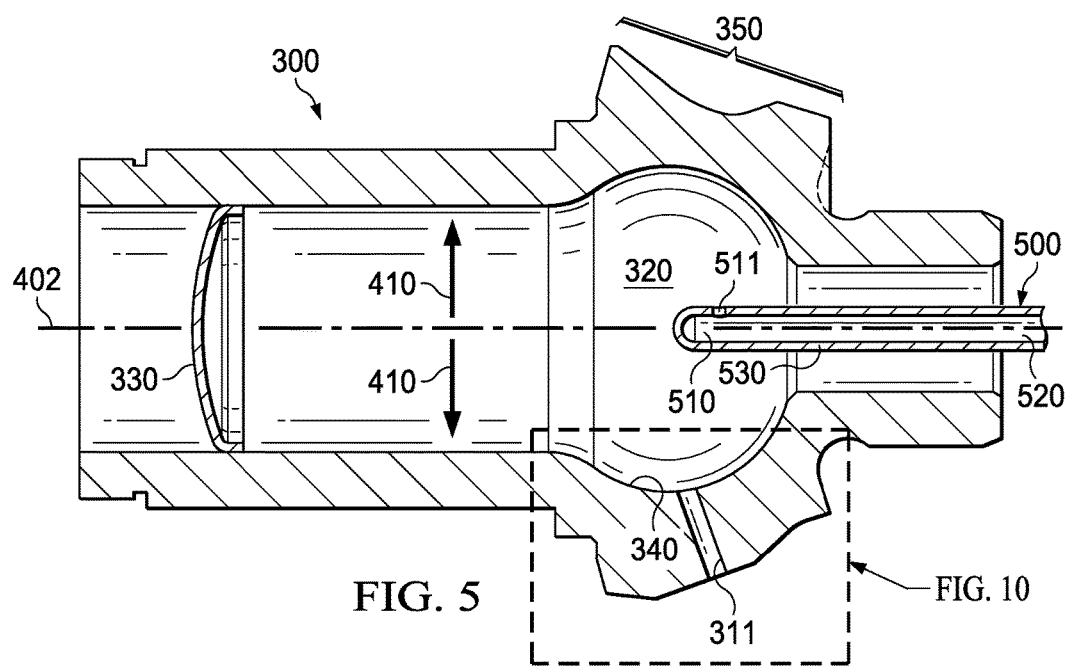
FIG. 5 is a sectioned, side view of the gear of FIG. 4, according to one example embodiment.
Figure 6:
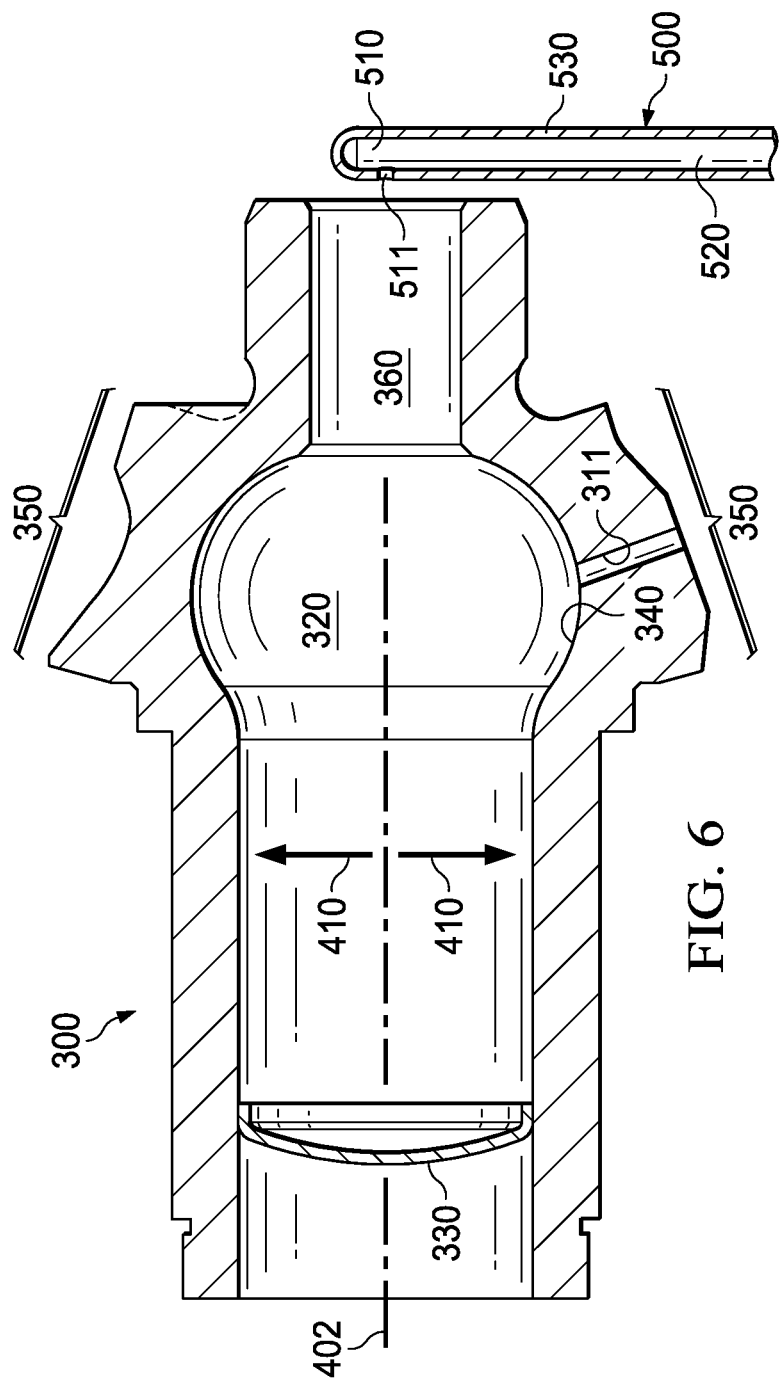
FIG. 6 is a sectioned, side view of the gear of FIG. 4, according to one example embodiment.
Figure 7:
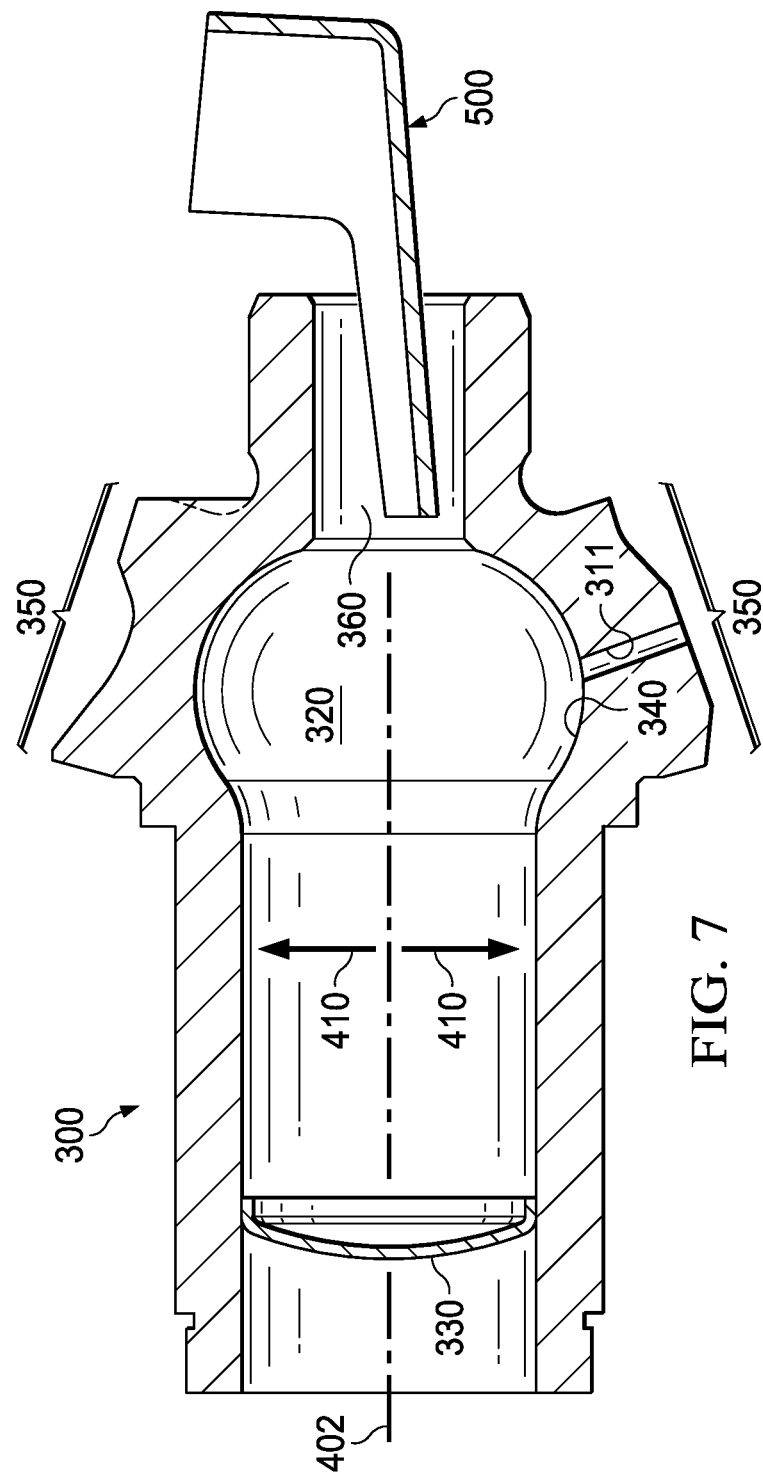
FIG. 7 is a sectioned, side view of the gear of FIG. 4, according to one example embodiment.

Now referring also to FIGS. 5 through 7, gear 300 can include a cavity, such as cavity 320, that can be located in an interior portion of gear 300. Cavity 320 can be machined out of gear 300 and can be machined to any shape. In one example embodiment, cavity 320 has a bulbous shape. Cavity 320 can define an inner wall portion 340 of gear 300.

The lubrication system of the present disclosure can include a lubricant delivery device 500. In one example, lubricant delivery device 500 can represent a lubricant flow restrictor device or a lubricant jet that can have the general shape of a long, hollow cylinder, as seen in FIGS. 5 and 6. Lubricant delivery device 500 can be partially disposed within cavity 320 of gear 300 and can be located on or near axis 402, as shown in FIG. 5. Lubricant delivery device 500 can have one or more opening 511 that can represent an opening through wall 530 of lubricant delivery device 500. In one example embodiment, opening 511 can be located on a downstream portion 510 of lubricant delivery device 500. Lubricant delivery device 500 can be configured so that pressurized lubricant is delivered from upstream portion 520 to downstream portion 510, from downstream portion 510 through opening 511, and from opening 511 of lubricant delivery device 500 to cavity 320 of gear 300. Lubricant can be provided to lubricant delivery device 500 by either a primary or a secondary lubrication system. Gear 300 can include cap 330 that prevents lubricant from flowing out of cavity 320.

In another example embodiment, as best seen in FIG. 6, lubricant delivery device 500 can represent a lubricant jet and can be disposed outside of gear 300. Lubricant delivery device 500 can be configured so that pressurized lubricant is delivered from upstream portion 520 to downstream portion 510, and from downstream portion 510 through opening 511. Because the lubricant can be pressurized, the lubricant can be ejected from opening 511 into opening 360 of gear 300, and from opening 360 of gear 300 to cavity 320 of gear 300.

In yet another example embodiment, as best seen in FIG. 7, lubricant delivery device 500 can be a scupper that can be partially disposed within opening 360 of gear 300. In this example, lubricant delivery device 500 can represent a device that is configured to collect lubricant and drain the collected lubricant into gear 300. For example, lubricant delivery device 500 can collect lubricant that is splashed from the exterior of gear 300 or other nearby gears. After the lubricant is collected, lubricant delivery device 500 can use a force, such as gravity, to guide the lubricant to opening 360 of gear 300 and/or cavity 320 of gear 300.

Now referring to FIGS. 5 through 10, gear 300 can include at least one aperture, such as lubricant feed aperture 311, which extends from inner wall portion 340 of cavity 320 to toothed portion 350 of gear 300. A machining device, such as a carbide twist drill, polycrystalline diamond (PCD) drill, electrical discharge machining, laser drill, and/or water jet, can be used to machine lubricant feed aperture 311 into gear 300. In some examples, it may be beneficial to machine lubricant feed aperture 311 prior to gear 300 being heat treated. Lubricant feed aperture 311 can be configured to deliver lubricant from cavity 320 to the outer, toothed portion 350 of gear 300. When gear 300 is rotating, centrifugal force 410 can cause lubricant to be pushed from cavity 320 to the toothed portion 350 of gear 300.

The diameter of lubricant feed aperture 311 can be determined by several factors. These factors include the speed of rotation of gear 300, the distance of lubricant feed aperture 311 from axis 402, the viscosity of the lubricant during a loss of lubricant event, and the required amount of lubricant to prevent failure of gear 300 during a loss of lubrication event.

Figure 8:
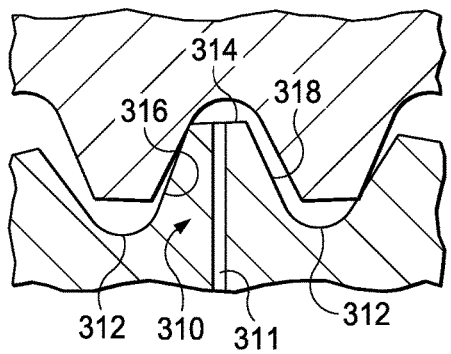
FIG. 8 is a sectioned view of the gear of FIG. 4 meshing with another toothed part, according to one example embodiment.
Figure 9:
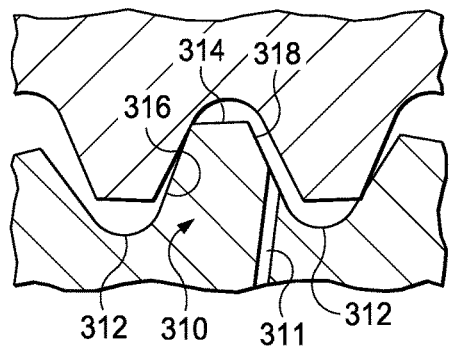
FIG. 9 is a sectioned view of the gear of FIG. 4 meshing with another toothed part, according to one example embodiment.

Now referring also to FIGS. 8 and 9, it should be understood that different example embodiments of the positioning of lubricant feed aperture 311 exists. In one example, as shown in FIG. 8, lubricant feed aperture 311 may radially extend from inner wall portion 340 to top land 314 of gear tooth 310. In another example, lubricant feed aperture 311 may extend from inner wall portion 340 to a bottom land 312 of gear tooth 310. In another example, as shown in FIG. 9, lubricant feed aperture 311 may extend from inner wall portion 340 to the coast side 318 of gear tooth 310. In yet another example, lubricant feed aperture 311 may extend from inner wall portion 340 to the driving side 316 of gear tooth 310. However, it should be noted that placing lubricant feed aperture 311 through the coast side 318 of gear tooth 310 may be more preferable than placing lubricant feed aperture 311 through the driving side 316 of gear tooth 310. For example, as can be seen in FIGS. 8 and 9, the plurality of gear teeth 310 of gear 300 can be configured to mesh with another toothed part. The driving side 316 of gear tooth 310 can be configured to contact and push the tooth of another part. Accordingly, driving side 316 of gear tooth 310 may experience more stress than coast side 318 of gear tooth 310.

Figure 10:
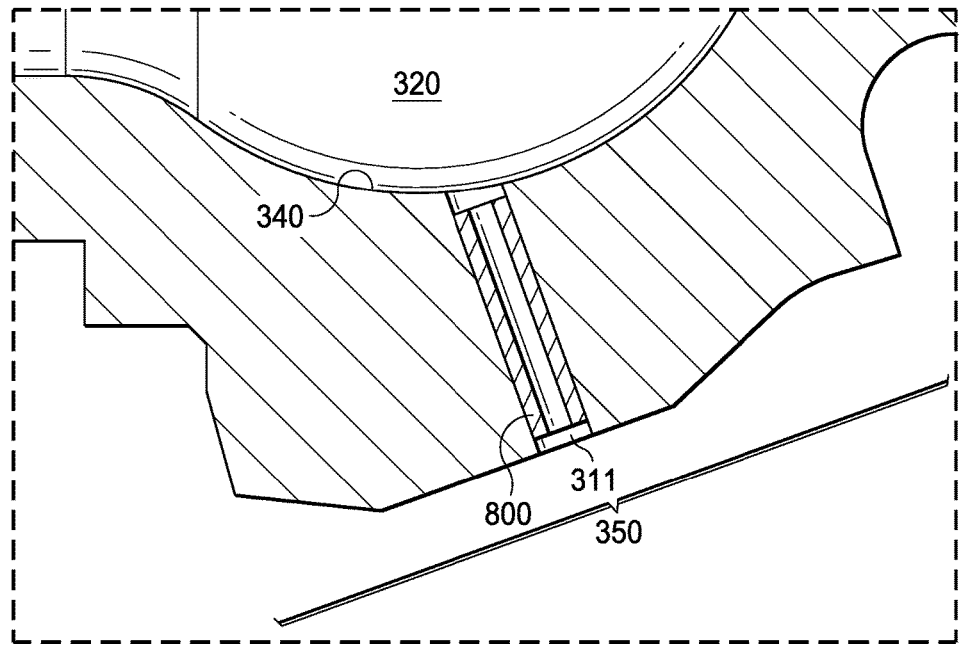
FIG. 10 is a portion of the sectioned view of FIG. 5, according to one example embodiment.

In some example embodiments, it may not be possible to drill lubricant feed aperture 311 such that its diameter is small enough to cause a preferred amount of resistance of flow. For example, if the diameter of lubricant feed aperture 311 is too large, the lubricant may be ejected out of cavity 320 too quickly. Accordingly, it may be necessary to include a flow restricting device 800. Flow restricting device 800 may represent a multi-orifice flow restrictor or a single-orifice flow restrictor that may be procured from The Lee Company of Westbrook, Connecticut (http://www.theleeco.com). Flow restricting device 800 can be disposed within lubricant feed aperture 311 and can be configured to reduce flow rate through lubricant feed aperture 311, as best seen in FIG. 10.

The gear and method of the present disclosure may extend the amount of time gearbox 115 is operable during a loss of lubrication event. For example, during normal operation, lubricant can be continuously fed to the inside of gear 300 such that during a loss of lubrication event there would be a reservoir of oil in cavity 320. During a loss of lubrication of event, the lubricant would slowly flow from cavity 320 to oil feed aperture 311, from oil feed aperture 311 to toothed portion 350. It should be noted that some shapes of cavity 320 may be preferable over others. For example, a bulbous shape, as shown in FIG. 5, may allow gear 300 to store more lubricant when centrifugal force is acting on the lubricant. Additionally, the bulbous shape can allow the lubricant to be directed towards oil feed aperture 311.

Figure 11:
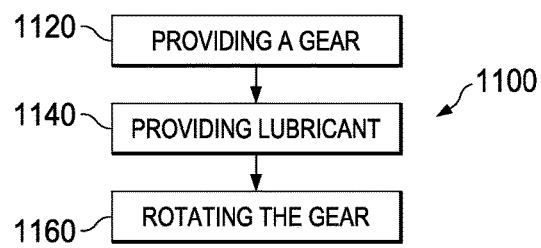
FIG. 11 is a schematic view of a method for providing lubricant to a gear, according to one example embodiment.

Now referring also to FIG. 11, a schematic view of method 1100 for lubricating a gear, such as gear 300 is depicted. In step 1120 of method 1100, a gear, such as gear 300 is provided. As stated, gear 300 can include toothed portion 350, and inner wall portion 340 that can define cavity 320. Gear 300 can also include lubricant feed aperture 311 that extends from inner wall portion 340 to toothed portion 350. In step 1140, lubricant can be provided to cavity 320 of gear 300. Next, in step 1160, gear 300 can be rotated on axis 402. The rotation of gear 300 can cause gravity to act on the lubricant within cavity 320, and force the lubricant from cavity 320 to lubricant feed aperture 311, from lubricant feed aperture 311 to toothed portion 350 of gear 300.

In addition to the potential benefit of extending the amount of time a gearbox is operable during a loss of lubrication event, there are several other potential advantages of the method and apparatus of the current disclosure. These potential advantages apply to both a gearbox that is not experiencing a loss of lubrication event and to a gearbox that is experiencing a loss of lubrication event. One potential advantage can be the delivery of lubricant deep into the mesh of the gear. Another potential advantage can be the prevention of hard contact between the teeth of a gear and another toothed part. Yet another potential advantage can be the reduction of weight and/or complexity of the gearbox.

The particular embodiments disclosed above are illustrative only, as the apparatus and method may be modified and practiced in different but equivalent manners apparent to those skilled in the art having the benefit of the teachings herein. Modifications, additions, or omissions may be made to the apparatuses and methods described herein without departing from the scope of the invention. The components of the apparatus and method may be integrated or separated.

Furthermore, no limitations are intended to the details of construction or design herein shown, other than as described in the claims below. It is therefore evident that the particular embodiments disclosed above may be altered or modified and all such variations are considered within the scope and spirit of the application. Accordingly, the protection sought herein is as set forth in the claims below.

To aid the Patent Office, and any readers of any patent issued on this application in interpreting the claims appended hereto, applicants wish to note that they do not intend any of the appended claims to invoke paragraph 6 of 35 U.S.C. § 112 as it exists on the date of filing hereof unless the words "means for" or "step for" are explicitly used in the particular claim.

The invention claimed is:

1. A gear, comprising:
   a toothed portion comprising a plurality of teeth;
   an inner wall portion defining a cavity; and
   a lubricant feed aperture that extends from the inner wall portion to a surface of a tooth of the plurality of teeth, wherein the lubricant feed aperture is configured to deliver lubricant from the cavity to the surface of the tooth.

2. The gear of claim 1, wherein the lubricant feed aperture extends from the inner wall portion to a top land of one of the plurality of teeth.

3. The gear of claim 1, wherein the lubricant feed aperture extends from the inner wall portion to a bottom land of one of the plurality of teeth.

4. The gear of claim 1, wherein the lubricant feed aperture extends from the inner wall portion to a coast side of one of the plurality of teeth.

5. The gear of claim 1, wherein the lubricant feed aperture comprises a flow restricting device, wherein the flow restricting device can be configured to reduce a flow rate of lubricant through the lubricant feed aperture.

6. The gear of claim 1, wherein each of the plurality of teeth are configured to mesh with a toothed part of a mating device.

7. The gear of claim 1, wherein a center portion of the wall of the cavity has a greater circumference than an end portion of the wall of the cavity and that the lubricant feed aperture is configured to deliver lubricant from the center portion of the wall of the cavity to the surface of the tooth.

8. A lubrication system comprising:
A gear, comprising:
 a toothed portion comprising a plurality of teeth;
 an inner wall portion defining a cavity; and
 a lubricant feed aperture that extends from the inner wall portion to a surface of a tooth of the plurality of teeth, wherein the lubricant feed aperture is configured to deliver lubricant from the cavity to the surface of the tooth; and
a lubricant delivery device configured to deliver lubricant into the cavity of the gear.

9. The lubrication system of claim 8, wherein the lubricant delivery device is configured to deliver pressurized lubricant from an opening in a wall of the lubricant delivery device to the cavity of the gear.

10. The lubrication system of claim 8, further comprising:
a scupper configured to catch splashed oil and deliver lubricant into the cavity of the gear.

11. The lubrication system of claim 8, wherein the lubricant feed aperture extends from the inner wall portion to a top land of one of the plurality of teeth.

12. The lubrication system of claim 8, wherein the lubricant feed aperture extends from the inner wall portion to a bottom land of one of the plurality of teeth.

13. The lubrication system of claim 8, wherein the lubricant feed aperture extends from the inner wall portion to a coast side of one of the plurality of teeth.

14. The lubrication system of claim 8, wherein the lubricant feed aperture comprises a flow restricting device, wherein the flow restricting device can be configured to reduce a flow rate of lubricant through the lubricant feed aperture.

15. The lubrication system of claim 8, wherein a center portion of the wall of the cavity has a greater circumference than an end portion of the wall of the cavity and that the lubricant feed aperture is configured to deliver lubricant from the center portion of the wall of the cavity to the surface of the tooth.

16. A method, comprising:
providing a gear, the gear comprising:
 a toothed portion comprising a plurality of teeth;
 an inner wall portion defining a cavity; and
 a lubricant feed aperture that extends from the inner wall portion to a surface of a tooth of the plurality of teeth;
providing lubricant to the cavity; and
rotating the gear on an axis, causing gravity to act on the lubricant and force the lubricant from the cavity to the lubricant feed aperture, from the lubricant feed aperture to the surface of a tooth of the plurality of teeth.

17. The method of claim 16, wherein the step of providing lubricant to the cavity comprises:
delivering lubricant from a lubricant delivery device configured to deliver lubricant into the cavity.

18. The method of claim 16, wherein the lubricant feed aperture extends from the inner wall portion to a top land of one of the plurality of teeth.

19. The method of claim 16, wherein the lubricant feed aperture extends from the inner wall portion to a coast side of one of the plurality of teeth.

20. The method of claim 16, wherein the lubricant feed aperture comprises a flow restricting device, wherein the flow restricting device can be configured to reduce a flow rate of lubricant through the lubricant feed aperture.

* * * * *